US008654614B2

(12) United States Patent
Kandori et al.

(10) Patent No.: US 8,654,614 B2
(45) Date of Patent: Feb. 18, 2014

(54) CAPACITIVE ELECTROMECHANICAL TRANSDUCER

(75) Inventors: Atsushi Kandori, Ebina (JP); Masao Majima, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 13/012,699

(22) Filed: Jan. 24, 2011

(65) Prior Publication Data

US 2011/0182149 A1 Jul. 28, 2011

(30) Foreign Application Priority Data

Jan. 26, 2010 (JP) ................................ 2010-014044

(51) Int. Cl.

| | |
|---|---|
| ***G01V 1/155*** | (2006.01) |
| ***H04R 19/00*** | (2006.01) |
| ***B06B 1/06*** | (2006.01) |
| ***H02N 1/00*** | (2006.01) |
| ***H02N 1/04*** | (2006.01) |

(52) U.S. Cl.

USPC ........... 367/189; 310/309; 310/311; 367/140; 367/181

(58) Field of Classification Search

USPC .......... 257/254, 414, 416; 367/140, 181, 189; 438/50, 53; 310/311, 309

See application file for complete search history.

(56) References Cited

U.S. PATENT DOCUMENTS

| | | | | |
|---|---|---|---|---|
| 6,430,109 B1 | 8/2002 | Khuri-Yakub | | |
| 7,770,279 B2 * | 8/2010 | Nguyen-Dinh et al. | ........ | 29/594 |
| 7,846,102 B2 * | 12/2010 | Kupnik et al. | ................ | 600/459 |
| 2006/0131990 A1 * | 6/2006 | Milsom et al. | ................ | 310/311 |
| 2006/0179640 A1 * | 8/2006 | Machida et al. | ................ | 29/594 |
| 2008/0089179 A1 | 4/2008 | Matsumoto | | |
| 2008/0184549 A1 | 8/2008 | Nguyen-Dinh | | |
| 2009/0080292 A1 * | 3/2009 | Wagner et al. | ................ | 367/181 |
| 2009/0189480 A1 * | 7/2009 | Machida et al. | .............. | 310/300 |

FOREIGN PATENT DOCUMENTS

| | | | |
|---|---|---|---|
| CN | 101262958 | A | 9/2008 |
| EP | 1098719 | B1 | 4/2007 |
| JP | 2003-527947 | T | 9/2003 |
| JP | 2009-077404 | A | 4/2009 |

OTHER PUBLICATIONS

U.S. Appl. No. 13/141,488, filed Jun. 22, 2011, Yoshitaka Zaitsu.
U.S. Appl. No. 13/025,869, filed Feb. 11, 2011, Kazunari Fujii.
U.S. Appl. No. 13/114,567, filed May 24, 2011, Yoshihiro Hasegawa.
U.S. Appl. No. 13/087,178, filed Apr. 14, 2011, Yuichi Masaki.
U.S. Appl. No. 13/050,758, Mar. 17, 2011, Atsushi Kandori.

* cited by examiner

*Primary Examiner* — Isam Alsomiri
*Assistant Examiner* — Hovhannes Baghdasaryan
(74) *Attorney, Agent, or Firm* — Canon U.S.A., Inc. IP Division

(57) ABSTRACT

Provided is a transducer in which electrodes in a movable region are less likely to affect the mechanical characteristics of the movable region and in which nonuniform electrical potential distribution of the surface of the electrodes in the movable region is suppressed. The transducer includes first electrodes and second electrodes opposing the first electrodes with gaps interposed between therebetween. The resistance per unit area of the first electrodes differs in a movable region relative to the second electrodes and an unmovable region relative to the second electrodes. The first electrodes in the movable region and the first electrodes in the unmovable region have different thicknesses.

13 Claims, 4 Drawing Sheets

FIG. 1A−1
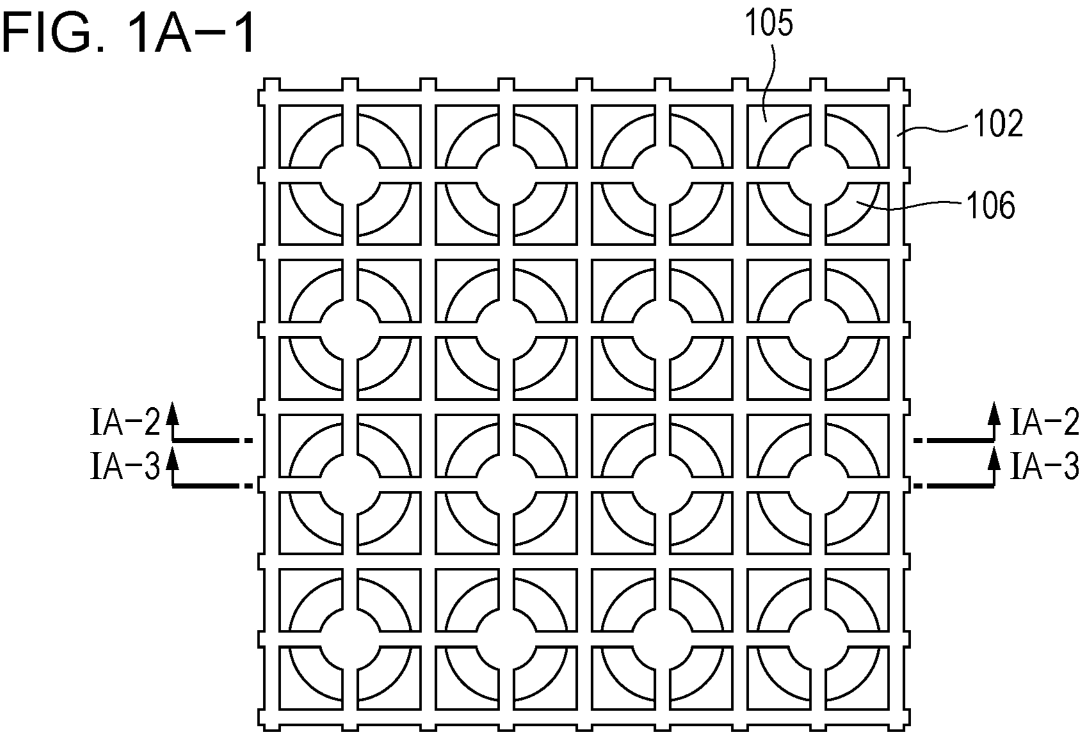
FIG. 1A−2
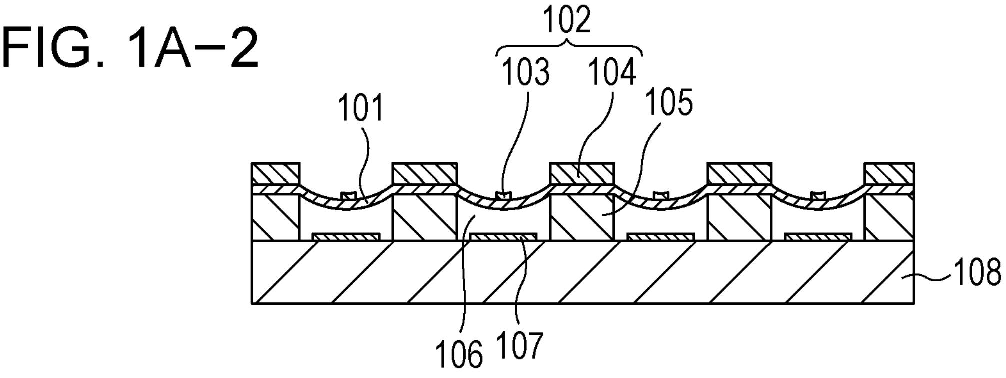
FIG. 1A−3
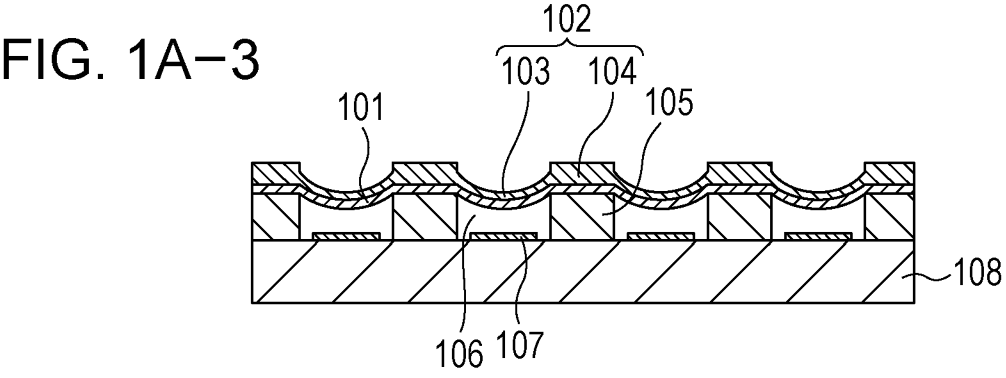

CAPACITIVE ELECTROMECHANICAL TRANSDUCER

BACKGROUND OF THE INVENTION

1. Field of the Invention

The present invention relates to a capacitive electromechanical transducer that transmits and/or receives elastic waves, such as ultrasonic waves.

2. Description of the Related Art

A capacitive micromachined ultrasonic transducer (CMUT), which is a capacitive electromechanical transducer, is proposed as a transducer that transmits and/or receives ultrasonic waves (refer to PCT Japanese Translation Patent Publication No. 2003-527947). The CMUT can be produced through a micro-electromechanical system (MEMS) process to which a semiconductor process is applied. FIGS. 3A to 3C are schematic views of a MEMS; FIG. 3A is a top view; FIG. 3B is a sectional view taken along line IIIB; and FIG. 3C is a sectional view taken along line IIIC. FIGS. 3A to 3C illustrate a vibrating membrane 101, first electrodes (upper electrodes) 102, supporting parts 105, gaps 106, second electrodes (lower electrodes) 107, and a substrate 108. In the CMUT, first electrodes 102 are formed on the vibrating membrane 101. The vibrating membrane 101 is supported by supporting parts 105 formed on the substrate 108. On the substrate 108, the first electrodes 102 are formed on the vibrating membrane 101, and the second electrodes 107 opposes the upper electrodes 102 with the gaps 106 (which are each usually 10 to 900 nm) provided therebetween. In FIG. 3, the vibrating membrane 101 sags toward the substrate 108 due to an external force. Each pair of electrodes opposing each other with the vibrating membrane 101 and one of the gaps 106 interposed therebetween is referred to as a cell. The CMUT, which is a transducer array, includes around 200 to 4000 elements, which each include a plurality of cells (usually around 100 to 3000 cells). The actual size of the CMUT is typically around 10 mm to 10 cm.

In the CMUT, all of the first electrodes 102 are electrically connected. The vibrating membrane 101 has areas P (represented by the hatched areas in FIG. 3A) in which the first electrodes 102 are not formed. The vibrating membrane 101 has such areas P to decrease its electrode area, which particularly influences the vibration characteristic, to a size that does not significantly affect the transmission and/or reception efficiency. The thickness of the first electrodes 102 formed on the vibrating membrane 101 is approximately one submicron, which is not ignorable with respect to the vibrating membrane 101 having a thickness of approximately 0.1 to 1.0 μm. Consequently, the first electrodes 102 have a significant effect on the vibration characteristic of the CMUT. Thus, the thickness of the first electrodes 102 on the vibrating membrane 101 is to be minimized. However, when thin first electrodes 102 are provided, the wiring resistance component of the electrodes becomes large, causing a nonuniform distribution of the electrical potential applied to the first electrodes 102 on the surface of the CMUT. During transmission and/or reception operation by the CMUT, a predetermined electrical potential is applied to the first electrodes 102, causing a difference in the electrical potentials of the first electrodes 102 and the second electrodes 107. This electrical potential difference generates an electrostatic attractive force, which is the external force, between the first electrodes 102 and the second electrodes 107, causing the vibrating membrane 101 to sag toward the substrate 108. Transmission and/or reception of ultrasonic waves are performed in this state. The amount of sagging determines the transmission and/or reception efficiency of ultrasonic waves. Therefore, when a nonuniform electrical potential distribution is generated on the surfaces of the first electrodes 102 of the CMUT, the amount of sagging of the vibrating membrane 101 changes, causing a fluctuation in the transmission and/or reception characteristics of the CMUT. This fluctuation causes degradation in the quality of images reproduced on the basis of information of the ultrasonic waves.

SUMMARY OF THE INVENTION

According to an aspect of the invention, a transducer includes a first electrode and a second electrode opposing the first electrodes. At least one of a transmitting operation of transmitting elastic waves by vibrating the first electrodes by generating an electrostatic attractive force that is modulated between the first electrodes and the second electrodes and receiving operation of detecting a change in capacitance between the first and second electrodes due to vibration in the first electrodes. Furthermore, resistance per unit area of the first electrodes differs in a movable region and an unmovable region relative to the second electrodes. Moreover, a thickness of the first electrodes in the movable region is smaller than or equal to a thickness of the first electrodes in the unmovable region.

Further features of the present invention will become apparent from the following description of exemplary embodiments with reference to the attached drawings.

BRIEF DESCRIPTION OF THE DRAWINGS

FIGS. 1A-1, 1A-2, 1A-3, 1B-1, and 1B-2 illustrate a capacitive electromechanical transducer according to first and second embodiments.

FIGS. 2A-1, 2A-2, 2B-1, and 2B-2 illustrate a capacitive electromechanical transducer according to third and fourth embodiments.

DESCRIPTION OF THE EMBODIMENTS

Figures 1, 1B:
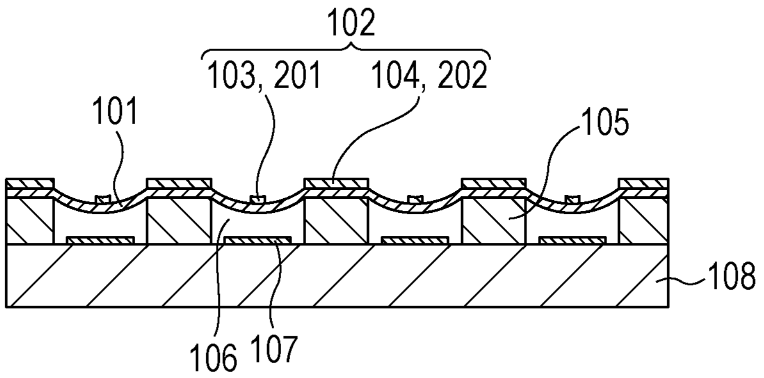

Embodiments of the present invention will be described below. With a capacitive electromechanical transducer according to the present invention, it is important that a movable region and an unmovable region have different resistances per unit area on a first electrode, where the thickness of the movable region is set smaller than or equal to the thickness of the unmovable region. The thickness of the first electrode influences the improvement of the mechanical characteristics of the movable parts, and the resistance influences the suppression of a nonuniform electrical potential distribution in the first electrode. Based on this concept, the capacitive electromechanical transducer according to the present invention has a basic configuration as described above. Based on this basic configuration, various embodiments described below are derived.

Typically, to easily suppress a nonuniform electrical potential distribution on the surface of the first electrodes, the resistance of the unmovable region is set smaller than that of the movable region. The first electrodes can be formed on a vibrating membrane supported by supporting parts, and the spring constant of the first electrodes in region where the supporting parts are not provided below the first electrodes (i.e., the above-described movable region) can be set smaller than that of the vibrating membrane (refer to the embodiments described below). It is, however, possible that the vibrating membrane double as first electrodes. The electrode material of the first electrodes is the same in the movable region and the unmovable region, and the thickness of the first electrodes in the movable region may be set smaller than that of the first electrodes in the unmovable region (refer to the first embodiment described below). It is also possible to use different electrode materials for the first electrodes in the movable region and the unmovable region (refer to the second embodiment described below). The first electrodes may be formed by stacking an electrode material in the unmovable region that is different from the electrode material used in the movable region of the first electrode (refer to the third embodiment described below). With the first electrodes in the movable region not sagging, the first electrodes in the movable region and the unmovable region can be set to the same height (refer to the fourth embodiment described below). In such a case, part of the first electrodes made of the same material in the unmovable region can fill grooves in the supporting parts that support the first electrodes (refer to the fourth embodiment described below). Such a configuration, however, can be provided by using different electrode materials for the movable region and the unmovable region (refer to the second and third embodiments described below).

The second electrodes, which oppose the first electrodes, can be disposed on a substrate of insulating material. Instead, the substrate may be made of a conductive material and double as the first electrodes. As described above, typically, a capacitive electromechanical transducer includes a plurality of elements, which each include a plurality of cells; and in the elements, first electrodes are connected to an electric circuit, and second electrodes are independently connected to the electric circuit. With such a configuration, reception operation in which elastic waves, such as sound waves, ultrasonic waves, acoustic waves, and photoacoustic waves, are detected by a change in capacitance between the first and second electrodes can be performed. Furthermore, transmission operation in which elastic waves, such as ultrasonic waves, are transmitted can be performed by generating a modulating electrostatic attractive force as a result of applying a modulating voltage between the first and second electrodes so as to vibrate the first electrodes. Furthermore, a continuous vibrating part may be formed through a plurality of cells, and its movable part may be the vibrating membrane and its unmovable part may be the supporting parts. Such a configuration can be easily produced through surface micromachining.

The capacitive electromechanical transducer can be produced through bulk micromachining in which a cavity structure is formed on a silicon substrate and an SOI substrate is joined. Instead of bulk micromachining, surface micromachining may be used as the production method. Specifically, for example, surface micromachining can be performed as described below. A silicon nitride membrane is formed on a sacrifice layer of a polysilicon layer for cavity formation, and etching holes are formed. The etching holes perform sacrifice layer etching to form cavities. Finally, the etching holes are filled with the silicon nitride membrane to form cavities.

The second electrodes in the capacitive electromechanical transducer according to the present invention are made of the materials listed below. That is, the second electrode can be made of at least one of a conductive body, a semiconductor, and an alloy, where the conductive body is selected from Al, Cr, Ti, Au, Pt, Cu, Ag, W, Mo, Ta, Ni, etc., the semiconductor is Si, etc., and the alloy is selected from AlSi, AlCu, AlTi, MoW, AlCr, TiN, AlSiCu, etc. The first electrodes may be disposed on the upper surface, on the back surface, and/or inside of the vibrating membrane or, instead, when the vibrating membrane is made of a conducting body or a semiconductor, as described above, the vibrating membrane may double as the first electrodes. The first electrodes according to the present invention can also be formed of a conductive body or a semiconductor, in the same manner as the second electrodes. The first electrodes and the second electrodes may be made of different materials. As described above, when the substrate is a semiconductor substrate, such as silicon, the substrate may double as the second electrodes.

Embodiments of the capacitive electromechanical transducer according to the present invention will be described below with reference to the drawings.

First Embodiment

Figures 1, 1B, 2:
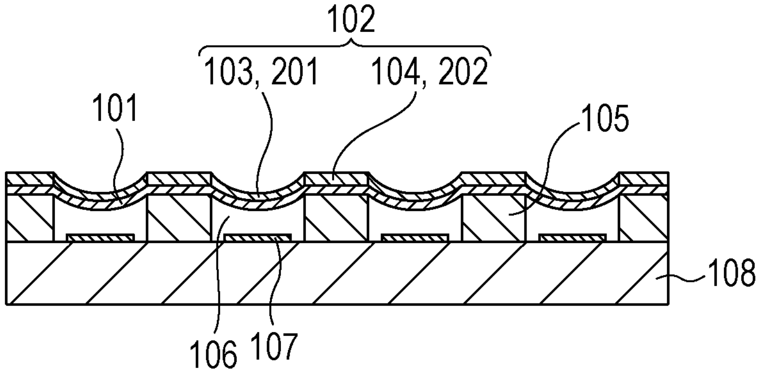

FIGS. 1A-1, 1A-2, and 1A-3 illustrate a CMUT, which is a capacitive electromechanical transducer according to a first embodiment. FIG. 1A-1 is a top view; FIG. 1A-2 is a sectional view taken along line IA-2; and FIG. 1A-3 is a sectional view taken along line IA-3. The drawing illustrates a vibrating membrane 101, upper electrodes 102, which are first electrodes, first-region upper electrodes 103, which are upper electrodes disposed in a first region, second-region upper electrodes 104, which are upper electrodes disposed in a second region, supporting parts 105, gaps 106, lower electrodes 107, which are second electrodes, and a substrate 108. In this embodiment, the upper electrodes 102 are formed on the vibrating membrane 101. All of the upper electrodes 102 in the CMUT are electrically connected. The vibrating membrane 101 is supported by the supporting parts 105 formed on the substrate 108 and vibrates together with the first-region upper electrodes 103. The lower electrodes 107 are formed on the substrate 108 at positions opposing the first-region upper electrodes 103 on the vibrating membrane 101 across the gaps 106.

As described below, the upper electrodes 102 in regions where the supporting parts 105 are not provided are referred to as the first-region upper electrodes 103 (which correspond to the first electrodes in the above-described movable region). The region in which the supporting parts 105 are not provided is a region in which the vibrating membrane 101 vibrates when transmitting and/or receiving ultrasonic waves. In other words, it is a region in which the vibrating membrane 101 and the first-region upper electrodes 103 are movable relative to the lower electrodes 107. The upper electrodes 102 in a region where the supporting parts 105 are provided are referred to as the second-region upper electrodes 104 (which correspond to the first electrodes in the above-described unmovable region). The region where the supporting parts 105 are provided is a region that does not actually vibrate when ultrasonic waves are transmitted and/or received. In other words, it is a region in which the second-region upper electrodes 104 are unmovable relative to the lower electrodes 107. In this embodiment, the resistance per unit area of the first-region upper electrodes 103 differs from the resistance per unit area of the second-region upper electrodes 104. Moreover, the thickness of the first-region upper electrodes 103 in the region where the supporting parts 105 are not provided is smaller than or equal to the thickness of the second-region upper electrodes 104 in the region where the supporting parts 105 are provided. The resistance per unit area of the second-region upper electrodes 104 is set lower than the resistance per unit area of the first-region upper electrodes 103. In the CMUT, a predetermined electrical potential is applied to the upper electrodes 102 from the peripheral parts. As described above, the CMUT includes a plurality of small cells, and the surface of the CMUT is finely segmented by the supporting parts 105. Thus, wiring resistance in the first-region upper electrodes 103 is smaller than the wiring resistance in the second-region upper electrodes 104. Consequently, by reducing the resistance component of the upper electrodes 102 on the supporting parts 105, i.e. the second-region upper electrodes 104, the nonuniform electrical potential of the entire CMUT can be easily suppressed.

In this embodiment, as a method of setting the resistance per unit area of the upper electrodes 102 in the first region different from the resistance per unit area of the second-region upper electrodes 104, the thickness of the upper electrodes 102 is controlled. Specifically, the thickness of the first-region upper electrodes 103 is set smaller than the thickness of the second-region upper electrodes 104 in the second region. Here, the first-region upper electrodes 103 and the second-region upper electrodes 104 are made of the same metal. Thickness is set as described above. In this embodiment, aluminum is used as a metal material. Instead, however other metals may also be used.

The vibration characteristics of the CMUT are determined by the spring constant of the vibrating membrane 101 and the sprint constant of the first-region upper electrodes 103. Specifically, the spring constant k of a circular vibrating membrane can be represented by the following expression.

$$k=(16\pi Y_0 * tm^3)/((1-\rho^2)*a^2)$$

where, $Y_0$ represents the Young's modulus, ρ represents density, a represents radius, and to represents thickness. Thus, to weaken the influence of the upper electrodes 102 on the vibration characteristics of the vibrating membrane 101, the thickness of the first-region upper electrodes 103 is set such that the spring constant of the first-region upper electrodes 103 is smaller than the spring constant of the vibrating membrane 101. At the same time, the vibrating membrane 101 and the upper electrodes 102 on the supporting parts 105 are fixed and hardly move even when the vibrating membrane 101 vibrates. Therefore, the vibrating membrane 101 and the second-region upper electrodes 104 on the supporting parts 105 do not greatly affect the vibration characteristics of the CMUT. Consequently, even when the thickness of the upper electrodes 102 on the supporting parts 105, i.e., the second-region upper electrodes 104, is increased, the vibration characteristics of the CMUT is not affected.

By increasing the thickness of the second-region upper electrodes 104, the resistance of the upper electrodes 102 on the supporting parts 105 (i.e., the second-region upper electrodes 104) can be lowered proportionally to the thickness even when the upper electrodes 102 are made of the same material as the second-region upper electrodes 104. Therefore, the wiring resistance from the peripheral part of the upper electrodes 102 to which an electrical potential is applied can be effectively decreased.

The CMUT according to this embodiment can be produced using MEMS technology. After parts of the CMUT other than the upper electrodes 102 are formed, the upper electrodes 102 are formed with the same thickness on the entire surface (i.e., the same thickness as the second-region upper electrodes 104), and then, the first-region upper electrodes 103 are formed by removing an equal depth by etching. In another possible method, after parts of the CMUT other than the upper electrodes 102 are formed, the upper electrodes 102 are formed with the same thickness on the entire surface (i.e., the same thickness as the first-region upper electrodes 103), and then, the first region is protected with resist. Then, a method such as plating or lift-off is used to set the second-region upper electrodes 104 to a desired thickness to form the electrodes.

With the configuration according to this embodiment, the upper electrodes 102 on the vibrating membrane 101 (i.e., the first-region upper electrodes 103) do not need to be thick, and a nonuniform electrical potential distribution of the surface of the upper electrodes, which are the first electrodes, can be suppressed. Therefore, the vibration characteristics of the CMUT can be designed independently from the electrical potential distribution of the upper electrodes, thus, allowing a flexible design. Accordingly, a capacitive electromechanical transducer having excellent transmission and/or reception characteristics of ultrasonic waves and a small variation can be provided. By allowing the thickness of the upper electrodes to be changed, a capacitive electromechanical transducer can be provided by using the same metal material for the upper electrodes and without largely changing the known configuration and production method of transducers.

Second Embodiment

A second embodiment will be described below with reference to FIGS. 1B-1, and 1B-2, which are sectional views of FIGS. 1A-2 and 1A-3, respectively. In the second embodiment, the configuration of the second-region upper electrodes 104 differs from that in the first embodiment. Other configurations are the same as those of the first embodiment. In this embodiment, as a method of setting the resistance per unit area of the first-region upper electrodes 103 different from the resistance per unit area of the second-region upper electrodes 104, different electrode materials are used in the first region and the second region.

In FIGS. 1B-1 and 1B-2, the first-region upper electrodes 103 are made solely of a first electrode material 201, and the second-region upper electrodes 104 is made solely of a second material 202. In this embodiment, the first material 201 is aluminum, and the second material 202 is copper. Instead, however, other metals may also be used. With the configuration according to this embodiment, since the electrode material of the upper electrodes 102 in the first region and the second region differs, the first electrode material 201 (which is aluminum here) is selected for the first region in consideration of the vibration characteristics and electrical characteristics of the CMUT. In the second region, the vibration characteristics of the CMUT do not need to be considered, and, thus, the second electrode material 202 (which is copper here) can be selected. In particular, since the second-region upper electrodes 104 are made solely of the second electrode material 202, there are no restrictions on the wiring design, and optimal wiring resistance can be provided.

Third Embodiment

Next, a third embodiment will be described with reference to FIGS. 2A-1 and 2A-2, which respectively correspond to the sectional views in FIGS. 1A-2 and 1A-3. In the third embodiment, the configuration of the upper electrodes in the second region differs from that of the first embodiment. Other configurations are the same as those of the first embodiment. In this embodiment, as a method of setting the resistance per unit area of the first-region upper electrodes 103 different from the resistance per unit area of the second-region upper electrodes 104, the thickness of the second-region upper electrodes 104 is controlled.

Figures 1, 2A:
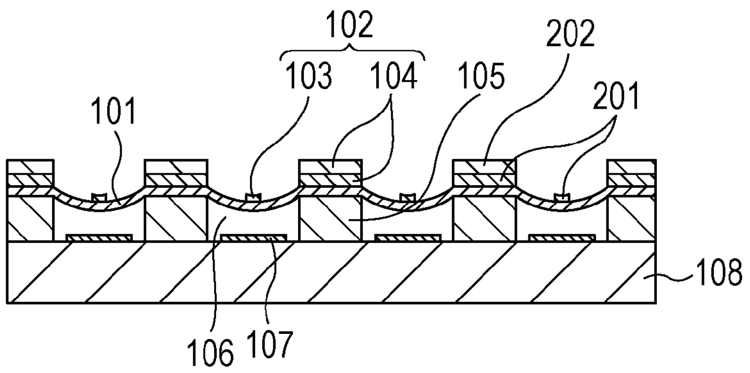
Figures 2, 2A:
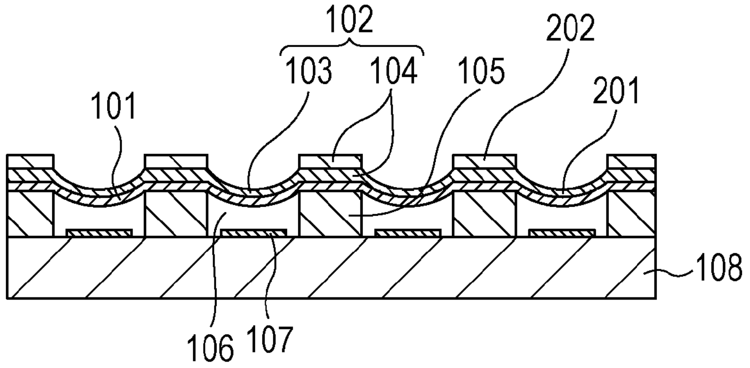

FIGS. 2A-1 and 2A-2 illustrate the first electrode material 201 and the second electrode material 202. In this embodiment, the first-region upper electrodes 103 are solely made of the first electrode material 201. The second-region upper electrodes 104 are each formed by stacking the second electrode material 202 on the first electrode material 201. In this embodiment, the first electrode material 201 is aluminum, and the second electrode material 202 is copper. Instead, however, other metals may be used.

With the configuration of this embodiment, the upper electrodes 102 on the supporting parts 105 (i.e., the second-region upper electrodes 104) can be considered as wiring resistors of two different electrode materials connected in series. Therefore, the wiring resistance of the second-region upper electrodes 104 can be effectively reduced. With such a configuration, the upper electrodes 102 on the vibrating membrane 101 (i.e., the first-region upper electrodes 103) do not need to be thick, and the nonuniform electrical potential distribution can be suppressed. In addition, since the second electrode material 202 does not affect the vibration, the mechanical characteristics thereof do not need to be considered, and, thus, the second electrode material 202 can be selected by only taking into consideration the electrical characteristics of the resistance. Consequently, the wiring resistance of the second-region upper electrodes 104 can be reduced even more effectively.

The CMUT according to this embodiment can be produced through the following method using MEMS technology. After forming parts of the CMUT other than the upper electrodes 102, the first electrode material 201 are formed as upper electrodes on the entire surface with the same thickness (i.e., the same thickness as the first-region upper electrodes 103). Then, the second electrode material 202 is applied on the first electrode material 201 such that the total thickness of the first electrode material 201 and the second electrode material 202 is the same as that of the second-region upper electrodes 104. Subsequently, the second electrode material 202 applied in the first region is removed using an etching method that only melts the second electrode material 202 and leaves the first electrode material 201 undamaged. In this way, the thickness of the first-region upper electrode 103 can be determined in accordance with the controllability of the thickness of the first electrode material 201 being applied, and variation in the vibration characteristics of the CMUT can be easily suppressed.

Another production method may also be used. After forming parts of the CMUT other than the upper electrodes 102, the first electrode material 201 are formed as upper electrodes on the entire surface with the same thickness (i.e., the same thickness as the first-region upper electrodes 103). Next, the first electrode material 201 applied to the first region is protected with a resist. Then, the second electrode material 202 is applied on the entire surface such that the total thickness of the first electrode material 201 and the second electrode material 202 is the same as that of the second-region upper electrodes 104. Finally, the resist and the second electrode material 202 applied thereon are removed such that only the first electrode material 201 remains in the first region. This process is known as “lift off.” Instead, after protecting with the resist, a plating method for selectively applying the second electrode material on the second region may be used for production.

Fourth Embodiment

Next, a fourth embodiment will be described with reference to FIGS. 2B-1 and 2B-2, which respectively correspond to the sectional views in FIGS. 1A-2 and 1A-3. In the fourth embodiment, the configuration of the upper electrodes 102 differs from that of the first to third embodiments. Other configurations are the same as those of the first to third embodiments. In this embodiment, the height of the upper surfaces of the first-region upper electrodes 103 and the height of the upper surfaces of the second-region upper electrodes 104 are substantially the same when the first-region upper electrodes 103 are not sagging.

Figures 1, 2B:
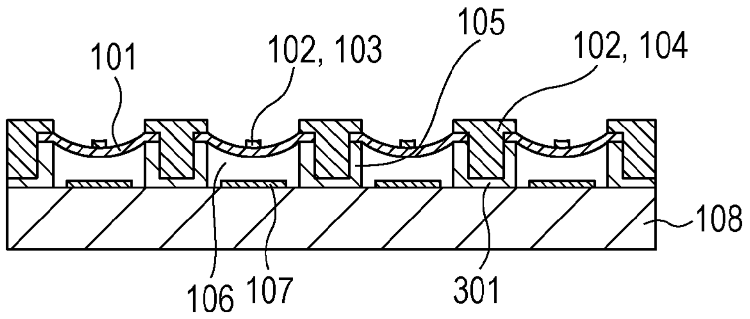
Figures 2, 2B:
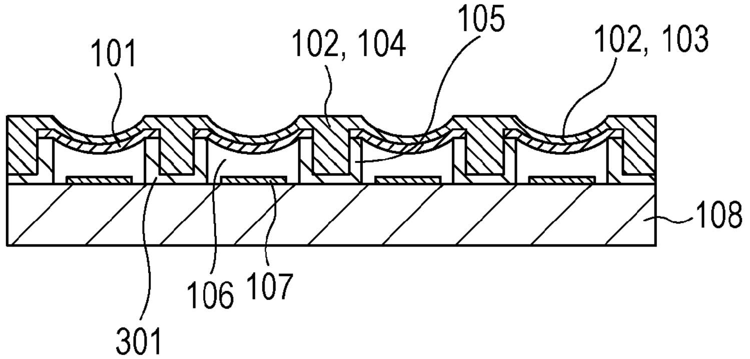
Figure 3A:
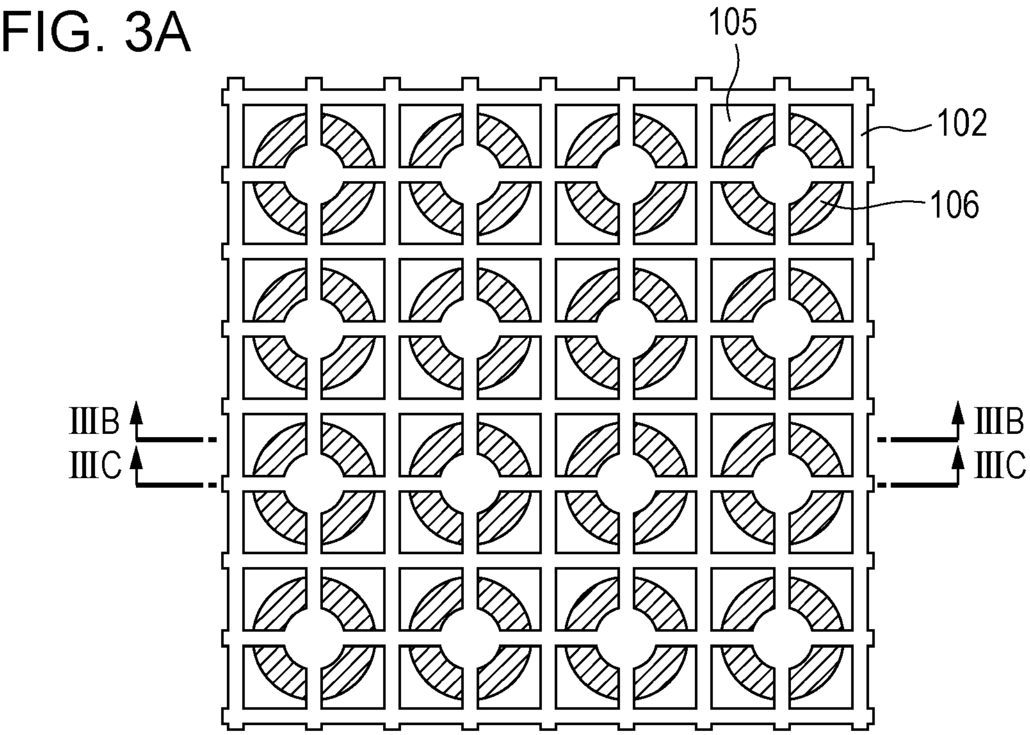
FIGS. 3A, 3B, and 3C illustrate a known capacitive electromechanical transducer.
Figure 3B:
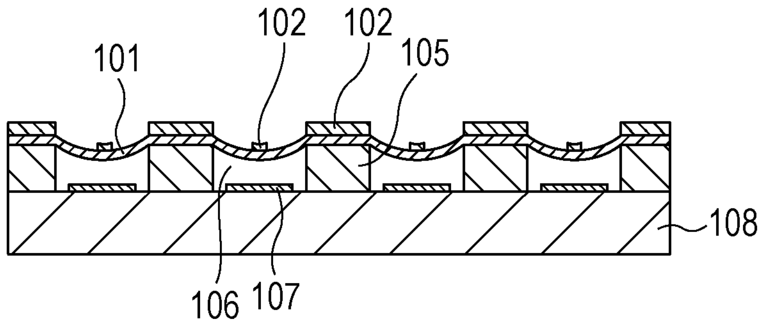
Figure 3C:
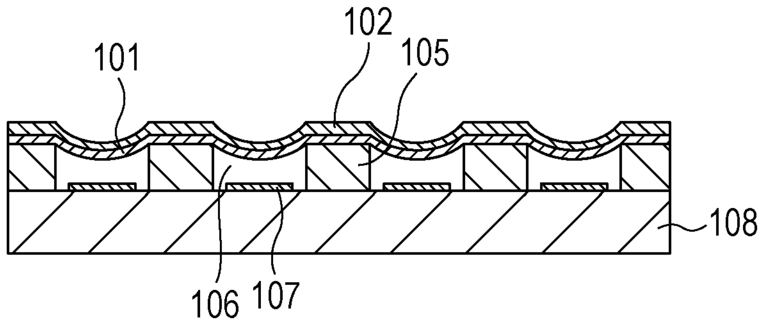

FIGS. 2B-1 and 2B-2 illustrate grooves 301. The grooves 301 are formed in the supporting parts 105. Part of the second-region upper electrodes 104 fills the grooves 301 in the supporting parts 105. The height of the upper surfaces of the first-region upper electrodes 103 and the height of the upper surfaces of the second-region upper electrodes 104 are substantially the same. By forming the grooves 301 in the supporting parts 105, the wiring resistance of the second-region upper electrodes 104 is reduced while the height of all of the upper electrodes 102 is set substantially the same. Accordingly, when the transmission and/or reception characteristics could be degraded due to the influence of the unevenness of the upper electrodes 102 on the transmitted and/or received ultrasonic waves and may cause some issues, such issues can be prevented.

With the configuration of this embodiment, the height of each upper electrode 102 is substantially the same. Therefore, the nonuniform electrical potential of the surface of the upper electrodes, which are the first electrodes, can be suppressed without influencing the ultrasonic waves being transmitted and/or received and without increasing the thickness of the upper electrodes 102 (the first-region upper electrodes 103) on the vibrating membrane 101.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-014044 filed Jan. 26, 2010, which is hereby incorporated by reference herein in its entirety.

What is claimed is:

1. A transducer comprising:

an element having a plurality of cells each including,
- a first electrode; and
- a second electrode opposing the first electrode with gap interposed between the first and second electrodes, wherein the first electrode comprising regions that can vibrate on the gap and a wiring region for connecting each of the regions that can vibrate, and wherein a thickness of the wiring region is thicker than a thickness of the regions that can vibrate.

2. The transducer according to claim 1, wherein a resistance in the wiring region is smaller than a resistance in each of the regions that can vibrate.

3. The transducer according to claim 1, wherein the first electrodes is provided on a vibrating membrane supported by supporting parts, and wherein a spring constant of the first electrodes in regions where the supporting parts is not provided below the first electrodes is smaller than a spring constant of the vibrating membrane.

4. The transducer according to claim 3, wherein part of the first electrodes in the wiring region fills grooves in the supporting parts supporting the first electrodes.

5. The transducer according to claim 1, wherein the regions that can vibrate and the wiring region comprising same electrode material.

6. The transducer according to claim 1, wherein the first electrodes in the wiring region includes a layer which comprising a material different from an electrode material of the first electrode in the regions that can vibrate.

7. The transducer according to claim 1, wherein, in the region that can vibrate and the wiring region, with the first electrode in the regions that can vibrate not sagging, height of an upper surface of the first electrode is the same.

8. A transducer comprising:

an element having a plurality of cells on a substrate, each cell including:

a first electrode; and a second electrode opposing the first electrode with gap interposed between the first and second electrodes, wherein the first electrode comprising regions that can vibrate on the gap and a wiring region for connecting each of the regions that can vibrate, and wherein, when comparing equal-sized orthographically-projected areas toward the substrate side in the regions that can vibrate and in the wiring region, a resistance is smaller in the wiring region than a resistance in each of the regions that can vibrate.

9. The transducer according to claim 8, wherein a thickness of the regions that can vibrate is thicker than a thickness of the wiring region.

10. The transducer according to claim 8, wherein the first electrode is provided on a vibrating membrane supported by supporting part, and wherein a spring constant of the first electrode in region where the supporting part is not provided below the first electrode is smaller than a spring constant of the vibrating membrane.

11. The transducer according to claim 8, wherein the regions that can vibrate and the wiring region comprising same electrode material.

12. The transducer according to claim 8, wherein the first electrode in the wiring region includes a layer which comprising a material different from an electrode material of the first electrode in the regions that can vibrate.

13. The transducer according to claim 8, wherein a resistance of an electrode material in the wiring region is smaller than a resistance of an electrode material in the regions that can vibrate.

* * * * *